United States Patent
Tseng

(10) Patent No.: US 6,412,959 B1
(45) Date of Patent: Jul. 2, 2002

(54) REAR VIEW MIRROR DEVICE HAVING DISPLAYER OR MONITOR

(76) Inventor: Huan Chin Tseng, 6F, No. 440-2, Gin Pin Road, Chong Ho City, Taipei Hsien (TW), 235

( * ) Notice: Subject to any disclaimer, the term of this patent is extended or adjusted under 35 U.S.C. 154(b) by 0 days.

(21) Appl. No.: 09/634,283

(22) Filed: Aug. 9, 2000

(51) Int. Cl.[7] .............................. B60R 1/08; G02B 5/08
(52) U.S. Cl. ...................... 359/839; 359/838; 359/844; 359/871; 345/7
(58) Field of Search ............................... 348/552, 118; 345/7; 359/839, 884, 630, 838, 844, 871; 340/905, 937, 461, 462

(56) References Cited

U.S. PATENT DOCUMENTS

| | | | | |
|---|---|---|---|---|
| 4,625,210 A | * | 11/1986 | Sagl | |
| 5,198,937 A | * | 3/1993 | Shy | 359/844 |
| 5,631,638 A | * | 5/1997 | Kaspar et al. | 340/905 |
| 5,649,317 A | * | 7/1997 | Suzuki | 455/345 |
| 5,956,181 A | * | 9/1999 | Lin | 359/630 |
| 6,106,121 A | * | 8/2000 | Buckley et al. | 359/839 |
| 6,126,289 A | * | 10/2000 | Nagayama | 359/854 |
| 6,170,956 B1 | * | 1/2001 | Rumsey et al. | 359/839 |
| 6,172,618 B1 | * | 1/2001 | Hakozaki et al. | 340/928 |

FOREIGN PATENT DOCUMENTS

JP     61-166744 A  *  7/1986

* cited by examiner

Primary Examiner—Cassandra Spyrou
Assistant Examiner—John Juba, Jr.

(57) ABSTRACT

A rear view mirror device of a vehicle has a mirror member disposed in front of a housing which is to be secured onto a vehicle. A displayer is disposed in the housing and disposed behind the mirror member and may be seen through the mirror member when the displayer is actuated. A circuit board is coupled to the displayer and coupled to an antenna for receiving signals from the other facilities. The housing has one or more extensions. One or more slides are slidably in the housing and biased toward the extension for clamping the housing onto a rear view mirror support.

7 Claims, 4 Drawing Sheets

REAR VIEW MIRROR DEVICE HAVING DISPLAYER OR MONITOR

BACKGROUND OF THE INVENTION

1. Field of the Invention

The present invention relates to a rear view mirror, and more particularly to a rear view mirror of a vehicle having a displayer or a monitor disposed therein.

2. Description of the Prior Art

Typical rear view mirror devices for vehicles comprise a mirror member attached or secured in a housing which is secured to the middle and upper portion of the vehicle or attached to the outer side portion of the vehicle, for viewing reflective images only.

Nowadays, satellite system operating guides or the like have been widely developed and used in vehicles. In addition, some of the vehicles use video cameras for taking pictures behind the vehicle. Accordingly, one or more displayers or monitors are required to be attached onto the vehicle. Many of the displayers or monitors are provided or disposed in the control panels for the vehicles. However, it will be difficult to attach or dispose the displayers or the monitors in the control panels of the vehicles after the vehicles have been manufactured and sold.

The present invention has arisen to mitigate and/or obviate the afore-described disadvantages of the conventional rear view mirror devices.

SUMMARY OF THE INVENTION

The primary objective of the present invention is to provide a rear view mirror device having a displayer or a monitor disposed therein for easily attaching onto any of the vehicles.

In accordance with one aspect of the invention, there is provided a rear view mirror device for attaching onto a rear view mirror support post of a vehicle, the rear view mirror device comprising a housing including a front portion, a mirror member attached to the front portion of the housing, attaching means for attaching the housing onto the rear view mirror support post of the vehicle, and a displayer disposed in the housing and disposed behind the mirror member. The displayer is allowed to be seen through the mirror member when the displayer is actuated.

The housing includes at least one chamber formed therein for receiving the displayer. The housing includes a plate secured in the front portion thereof and disposed between the displayer and the mirror member, the plate includes an opening formed therein for receiving the displayer.

A circuit board is coupled to the displayer. The housing includes an antenna coupled to the circuit board for signal receiving purposes. The housing includes an upper portion having at least one extension extended therefrom, the attaching means includes at least one slide slidably received in the housing and having a leg extended outward of the housing, and means for biasing the leg of the slide toward the extension and to clamp the housing to the rear view mirror support post of the vehicle.

The housing includes a rear wall having at least one channel formed therein for slidably receiving the slide, and includes a bottom wall having at least one orifice formed therein and communicating with the channel of the housing for outwardly extending of the slide relative to the housing.

A limiting means is further provided for limiting a relative movement between the slide and the housing and includes at least one stop provided in the housing for defining a shoulder in the housing, the slide includes a bar provided thereon for engaging with the shoulder of the stop and for preventing the slide from being disengaged from the housing.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
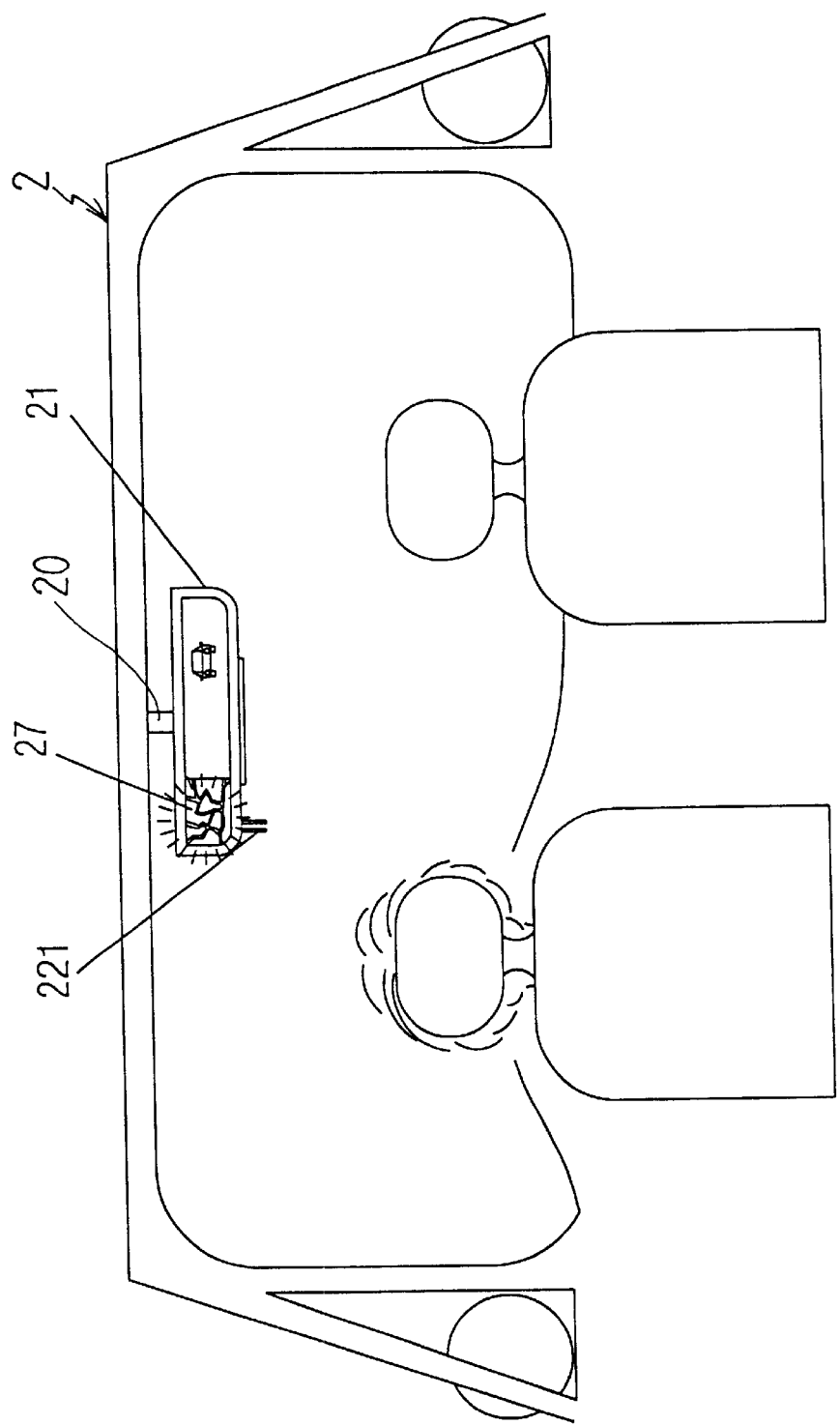
FIG. 1 is a partial plane schematic view illustrating a vehicle having a rear view mirror device in accordance with the present invention.
Figure 2:
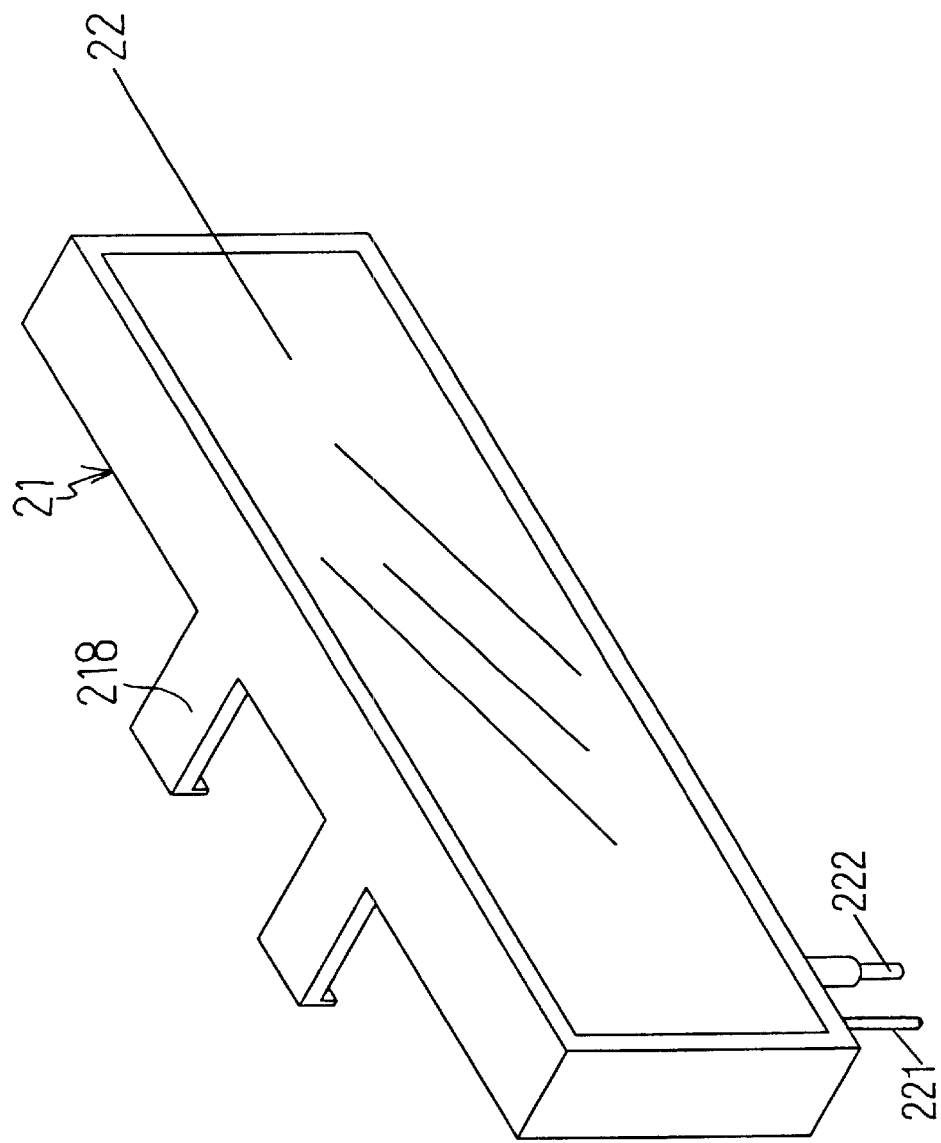
FIG. 2 is a perspective view of the rear view mirror device.

Referring to the drawings, and initially to FIGS. 1 and 2, a rear view mirror device in accordance with the present invention comprises a housing 21 for attaching onto a rear view mirror support post 20 (FIG. 1) that is provided on the upper and middle portion of a vehicle 2. The housing 21 of the rear view mirror device may also be attached to or disposed on either of the outer side portions of the vehicle.

Figure 3:
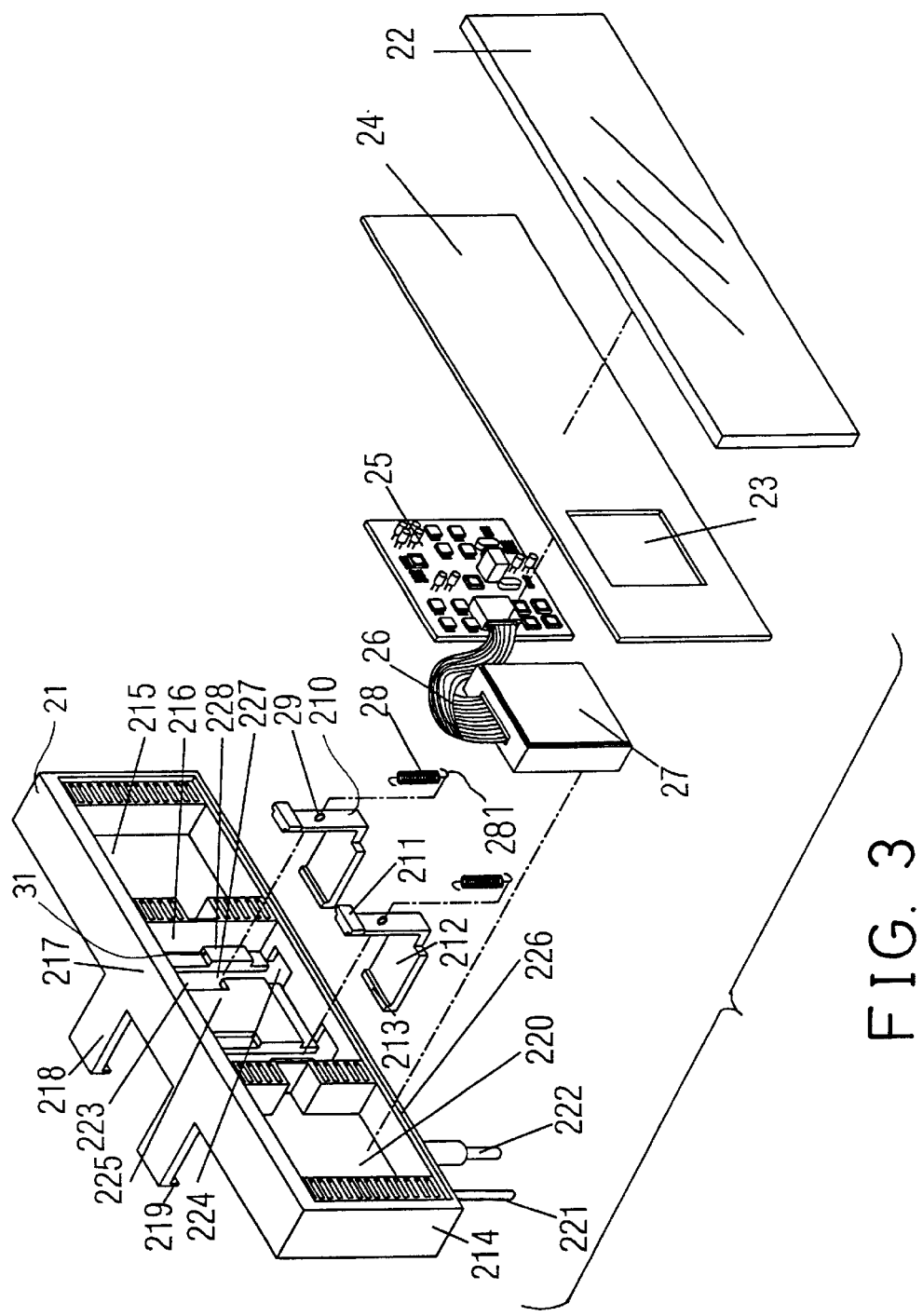
FIG. 3 is an exploded view of the rear view mirror device.
Figure 4:
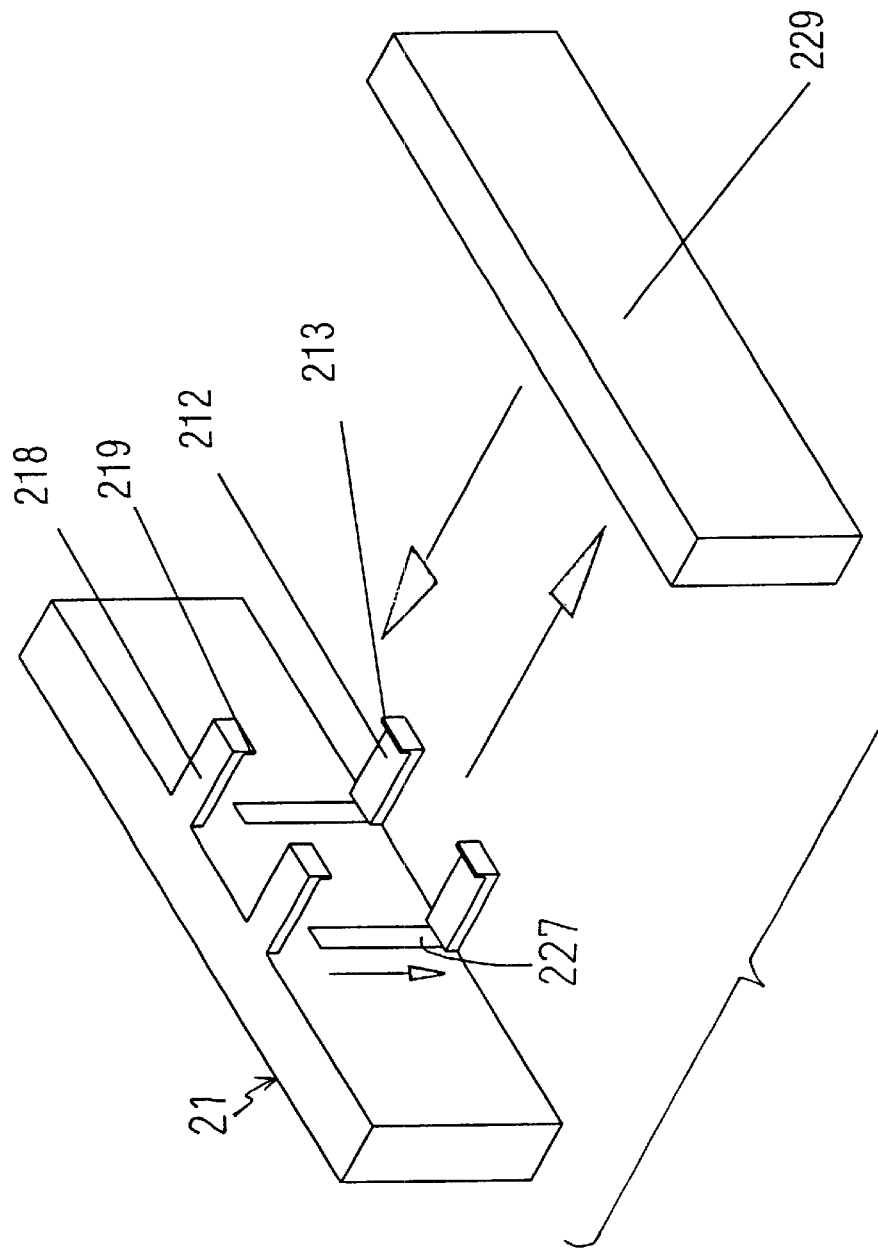
FIG. 4 is an exploded view illustrating the attachment of the rear view mirror device onto the vehicle.

As shown in FIGS. 2 and 3, the housing 21 includes two side walls 214, an upper wall 217, a rear wall 225, a bottom wall 226, and one or more chambers 215, 220, 223 formed therein and defined or separated by one or more partitions 216 that are provided in the housing 21. The housing 21 includes one or more extensions 218 extended rearward from the upper wall 217 thereof and each having a hook 219 provided on the rear end portion thereof for hooking onto the support block 229 (FIG. 4) that is attached to or provided on or extended from the rear view mirror support post 20 (FIG. 1). The housing 21 includes one or more channels 227 formed in the rear portion or formed in the rear wall 225 thereof for slidably receiving one or more slides 210 respectively, and includes one or more orifices 224 formed in the bottom wall 226 thereof and communicating with the channels 227 thereof for allowing the slides 210 to be extended downward and outward of the bottom wall 226 of the housing 21. The slides 210 each includes a leg 212 extended outward therefrom and having a hook 213 provided on the rear end portion thereof for hooking onto the support block 229 (FIG. 4) of the rear view mirror support post 20 (FIG. 1). The housing 21 includes one or more bulges or stops 228 provided therein for defining or forming one or more shoulders 31 therein. The slides 210 each includes a bar 211 provided on top thereof for engaging with the stops 228 or the shoulders 31 of the housing 21 and for limiting the slides 210 to slide relative to the housing 21 and for preventing the slides 210 from being disengaged from the housing 21. One or more springs 28 each ha 5 one end 281 secured to the ring 29 of the slides 210 respectively and each has the other end 281 secured to the upper wall 217 of the housing 21 for biasing the slides 210 upward toward the extensions 218 and for clamping the rear view mirror device onto the support block 229 of the rear view mirror support post 20 of the vehicle, best shown in FIG. 4.

As best shown in FIG. 3, a monitor or a displayer 27 and a circuit board 25 are disposed in the housing 21, such as disposed in the respective chambers 215, 220, 223 of the housing 21, and are coupled together with electric wires 26. The displayer 27 may be a liquid crystal displayer. A plate 24 is disposed in the front portion of the housing 21 for shielding the circuit board 25 and the other elements received in the housing 21, and includes an opening 23 formed therein for receiving the displayer 27 and for allowing the displayer 27 to be exposed outward of the plate 24. A mirror member 22 is secured in the front portion of the housing 21 and disposed in front of the plate 24 and thus in front of the displayer 27, and is applied with or electroplated with a layer of chrome or silver or the like thereon. An antenna 221 and an electric wire or a plug or a socket or a terminal 222 may further be provided or attached to the housing 21 and coupled to the circuit board 25 for receiving signals and for coupling to the electric power source respectively. For example, the signals from the satellite system operating guide or from the video camera may be received via the antenna 221 and may be treated in the circuit board 25, particularly the processing unit of the circuit board 25 and may then be displayed in the displayer 27. The terminal 222 may be coupled to the electric power source for energizing the electric elements.

In operation, as shown in FIG. 1, when the displayer 27 is energized, the images or the pictures of the displayer 27 may be seen through the mirror member 22. When the displayer 27 is not energized or is not actuated, the displayer 27 may not be seen through the mirror member 22 such that the rear view mirror member 22 may be used as a typical rear view mirror.

The rear view mirror device in accordance with the present invention having the monitor or the displayer disposed therein may be easily attached onto any of the vehicles without amending or modifying any portions or parts of the vehicles. Particularly, the control panels of the vehicles are not required to be modified for receiving the monitors or the displayers.

Accordingly, the rear view mirror device in accordance with the present invention includes a displayer or a monitor disposed therein for easily attaching onto any of the vehicles.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A rear view mirror device for attaching onto a rear view mirror support post of a vehicle, said rear view mirror device comprising:

a housing including a front portion, said housing including an upper portion having at least one extension extended therefrom, said housing including a rear wall having at least one channel formed therein, and including a bottom wall having at least one orifice formed therein and communicating with said at least one channel of said housing, a mirror member attached to said front portion of said housing, attaching means for attaching said housing onto the rear view mirror support post of the vehicle, said attaching means including at least one slide slidably received in said at least one channel of said housing and having a leg extended outward of said at least one orifice of said housing, means for biasing said leg of said at least one slide toward said at least one extension and to clamp said housing to the rear view mirror support post of the vehicle, and a displayer disposed in said housing and disposed behind said mirror member, said displayer being allowed to be seen through said mirror member when said displayer is actuated.

2. The rear view mirror device according to claim 1, wherein said housing includes at least one chamber formed therein for receiving said displayer.

3. The rear view mirror device according to claim 1, wherein said housing includes a plate secured in said front portion thereof and disposed between said displayer and said mirror member, said plate includes an opening formed therein for receiving said displayer.

4. The rear view mirror device according to claim 1 further comprising a circuit board coupled to said displayer.

5. The rear view mirror device according to claim 4, wherein said housing includes an antenna coupled to said circuit board for signal receiving purposes.

6. A rear view mirror device for attaching onto a rear view mirror support post of a vehicle, said rear view mirror device comprising:

a housing including a front portion, said housing including an upper portion having at least one extension extended therefrom, a mirror member attached to said front portion of said housing, attaching means for attaching said housing onto the rear view mirror support post of the vehicle, said attaching means including at least one slide slidably received in said housing and having a leg extended outward of said housing, means for biasing said leg of said at least one slide toward said at least one extension and to clamp said housing to the rear view mirror support post of the vehicle, a displayer disposed in said housing and disposed behind said mirror member, said displayer being allowed to be seen through said mirror member when said displayer is actuated, and means for limiting a relative movement between said at least one slide and said housing.

7. The rear view mirror device according to claim 6, wherein said limiting means includes at least one stop provided in said housing for defining a shoulder in said housing, said at least one slide includes a bar provided thereon for engaging with said shoulder of said at least one stop and for preventing said at least one slide from being disengaged from said housing.

* * * * *